United States Patent [19]

Ealba et al.

[11] Patent Number: 4,971,768

[45] Date of Patent: Nov. 20, 1990

[54] DIFFUSER WITH CONVOLUTED VORTEX GENERATOR

[75] Inventors: Robert H. Ealba, Grosse Pointe Farms, Mich.; Robert W. Paterson, Simsbury, Conn.; Walter M. Presz, Jr., Wilbraham, Mass.; Michael J. Werle, West Hartford, Conn.

[73] Assignee: United Technologies Corporation, Hartford, Conn.

[21] Appl. No.: 132,395

[22] Filed: Dec. 15, 1987

Related U.S. Application Data

[63] Continuation-in-part of Ser. No. 124,325, Nov. 23, 1987, abandoned, which is a continuation-in-part of Ser. No. 857,910, Apr. 30, 1987, abandoned, which is a continuation-in-part of Ser. No. 117,460, Nov. 2, 1987, Pat. No. 4,815,531, which is a continuation-in-part of Ser. No. 947,349, Dec. 29, 1986, abandoned, which is a continuation-in-part of Ser. No. 117,770, Nov. 5, 1987, Pat. No. 4,776,535, which is a continuation-in-part of Ser. No. 947,164, Dec. 29, 1986, Pat. No. 4,789,117.

[51] Int. Cl.[5] .......................... F01N 3/10; F01N 7/08; B01D 53/36

[52] U.S. Cl. .................................... 422/176; 422/177; 422/180; 422/205; 422/220; 422/222; 55/440; 55/464; 55/473; 55/529; 55/DIG. 30; 55/199; 55/319; 165/160; 165/174

[58] Field of Search ............... 422/176, 177, 180, 220, 422/222, 205, 45; 55/440, 464, 473, 529, DIG. 30, 199, 319; 165/159, 160, 174

[56] References Cited

U.S. PATENT DOCUMENTS

| | | | |
|---|---|---|---|
| 3,174,282 | 3/1965 | Harrison | 60/35.6 |
| 3,578,264 | 5/1971 | Kuethe | 181/220 X |
| 3,953,176 | 4/1976 | Santala et al. | 422/171 |
| 4,066,214 | 1/1978 | Johnson | 60/271 |
| 4,634,459 | 1/1987 | Pischinger et al. | 422/217 X |
| 4,783,959 | 11/1988 | Sickels | 422/220 X |

FOREIGN PATENT DOCUMENTS

| | | | |
|---|---|---|---|
| 2843365 | 4/1980 | Fed. Rep. of Germany | 422/176 |
| 13815 | 1/1979 | Japan | 422/176 |
| 731005 | 4/1980 | U.S.S.R. | 422/176 |

*Primary Examiner*—Robert J. Warden
*Assistant Examiner*—Lynn M. Kummert

[57] ABSTRACT

A thin, convoluted wall member disposed upstream of the inlet of a diffuser generates large-scale vortices having axes in the downstream direction. The vortices enhance mixing within the diffuser and can also energize the boundary layer, thereby improving diffuser performance and delaying the onset of stall. Greater diffusion angles without stall are possible. The member itself creates low losses.

30 Claims, 7 Drawing Sheets

DIFFUSER WITH CONVOLUTED VORTEX GENERATOR

This application is a continuation-in-part application of:

1. U.S.S.N. 124,325, filed Nov. 20, 1987, entitled Diffuser, by Walter M. Presz, Jr. et al., now abandoned, which is a continuation-in-part application of U.S.S.N. 857,910, filed Apr. 30, 1987, entitled Diffuser, by Walter M. Presz, Jr. et al., now abandoned;

2. U.S.S.N. 117,460, filed Nov. 2, 1987, entitled Heat Transfer Enhancing Device, by Walter M. Presz, Jr., et al., now U.S. Pat. No. 4,815,531, which is a continuation-in-part application of U.S.S.N. 947,349, filed Dec. 29, 1986, entitled Heat Transfer Enhancing Device, by Walter M. Presz, Jr. et al., now abandoned; and 3. U.S.S.N. 117,770, filed Nov. 5, 1987, entitled Convoluted Plate to Reduce Base Drag, by Robert W. Paterson et al., now U.S. Pat. No. 4,776,535, which is a continuation-in-part application of U.S.S.N. 947,164, filed Dec. 29, 1986, entitled Bodies With Reduced Drag, by Robert W. Paterson et al., now U.S. Pat. No. 4,789,117.

Reference is hereby made to the following additional co-pending, commonly owned U.S. patent applications disclosing subject matter related to the subject matter of the present application: (1) U.S.S.N. 857,907 entitled, Airfoil-Shaped Body, by W.M. Presz, Jr. et al filed 4/30/86; (2) U.S.S.N. 857,908 entitled, Fluid Dynamic Pump, by W.M. Presz, Jr. et al filed 4/30/86; (3) U.S.S.N. 857,909 entitled, Bodies With Reduced Surface Drag, by Walter M. Presz, Jr. et al. filed 4/30/86; )4) U.S.S.N. 947,166 entitled Improved Airfoil Trailing Edge, by R.W. Paterson et al filed 12/24/86; and (5) U.S.S.N. 947,166 entitled Improved Airfoil Trailing Edge, by M.J. Werle et al filed 12/29/86.

TECHNICAL FIELD

This invention relates to diffusers.

BACKGROUND ART

Diffusers are well known in the art. *Webster's New Collegiate Dictionary* (1981) defines diffusers as "a device for reducing the velocity and increasing the static pressure of a fluid passing through a system". The present invention is concerned with the most typical of diffusers, those having an inlet cross-sectional flow area less than their outlet cross-sectional flow area. While a diffuser may be used specifically for the purpose of reducing fluid velocity or increasing fluid pressure, often they are used simply because of a physical requirement to increase the cross-sectional flow area of a passage, such as to connect pipes of different diameters.

As hereinafter used in this specification and appended claims, "diffuser" shall mean a fluid carrying passage which has an inlet cross-sectional flow area less than its outlet cross-sectional flow area, and which decreases the velocity of the fluid in the principal flow direction and increases its static pressure.

If the walls of the diffuser are too steep relative to the principal flow direction, streamwise, two-dimensional boundary layer separation may occur. Streamwise, two-dimensional boundary layer separation, as used in this specification and appended claims, means the breaking loose of the bulk fluid from the surface of a body, resulting in flow near the wall moving in a direction opposite the bulk fluid flow direction. Such separation results in high losses, low pressure recovery, and lower velocity reduction. When this happens the diffuser is said to have stalled. Stall occurs in diffusers when the momentum in the boundary layer cannot overcome the increase in pressure as it travels downstream along the wall, at which point the flow velocity near the wall actually reverses direction. From that point on the boundary layer cannot stay attached to the wall and a separation region downstream thereof is created.

To prevent stall a diffuser may have to be made longer so as to decrease the required diffusion angle; however, a longer diffusion length may not be acceptable in certain applications due to space or weight limitations, for example, and will not solve the problem in all circumstances. It is, therefore, highly desirable to be able to diffuse more rapidly (i.e., in a shorter distance) without stall or, conversely, to be able to diffuse to a greater cross-sectional flow area for a given diffuser length than is presently possible with diffusers of the prior art.

Diffusers of the prior art may be either two- or three-dimensional. Two-dimensional diffusers are typically four sided, with two opposing sides being parallel to each other and the other two opposing sides diverging from each other toward the diffuser outlet. Conical and annular diffusers are also sometimes referred to as two-dimensional diffusers Annular diffusers are often used in gas turbine engines. A three-dimensional diffuser can for example, be four sided, with both pairs of opposed sides diverging from each other.

One application for a diffuser is in a catalytic converter system for automobiles, trucks and the like. The converter is used to reduce exhaust emissions (nitrous oxides) and to oxidize carbon monoxide and unburned hydrocarbons. The catalyst of choice is presently platinum Because platinum is so expensive it is important to utilize it efficiently, which means exposing a high surface area of platinum to the gases and having the residence time sufficiently long to do an acceptable job using the smallest amount of catalyst possible.

Currently the exhaust gases are carried to the converter in a cylindrical pipe or conduit having a cross sectional flow area of between about 2.5–5.0 square inches. The catalyst (in the form of a platinum coated ceramic monolith or a bed of coated ceramic pellets) is disposed within a conduit having, for example, an elliptical cross sectional flow area two to four times that of the circular inlet conduit. The inlet conduit and the catalyst containing conduit are joined by a diffusing section which transitions from circular to elliptical. Due to space limitations the diffusing section is very short; and its divergence half-angle may be as much as 45 degrees. Since flow separates from the wall when the half-angle exceeds about 7.0 degrees, the exhaust flow from the inlet pipe tends to remain a cylinder and, for the most part, impinges upon only a small portion of the elliptical inlet area of the catalyst. Due to this poor diffusion within the diffusing section there is uneven flow through the catalyst bed. These problems are discussed in a paper titled, Visualization of Automotive Catalytic Converter Internal Flows by Daniel W Wendland and William R. Matthes, SAE paper No. 861554 presented at the International Fuels and Lubricants Meeting and Exposition, Philadelphia, Pa., Oct. 6–9, 1986. It is d®sired to be able to better diffuse the flow within such short lengths of diffusing section in order to make more efficient use of the platinum catalyst and thereby reduce the required amount of catalyst.

DISCLOSURE OF THE INVENTION

One object of the present invention is a diffuser having improved operating characteristics.

Another object of the present invention is a diffuser which can accomplish the same amount of diffusion in a shorter length then that of the prior art.

Yet another object of the present invention is a diffuser which can achieve greater diffusion for a given length than prior art diffusers.

Accordingly, the present invention includes a thin, essentially two sided wall member disposed within a conduit upstream of a diffuser section inlet and spaced from the conduit wall surface, the member having a convoluted downstream portion which generates a plurality of adjacent vortices within the diffuser section rotating in opposite directions about respective axes extending in the direction of bulk fluid flow adjacent the plate-like member.

In one embodiment, the convoluted member is disposed upstream of a diffuser section inlet and is supported in closely spaced relation to the surface of the diffuser inlet conduit. The convoluted portion of the member comprises a plurality of adjoining, alternating, U-shaped lobes and troughs extending in the direction of bulk fluid flow near the member and terminating at a downstream edge, which is wave shaped. The trough depth and lobe height increase in the downstream direction, and the troughs and lobes are contoured and dimensioned such that each trough generates a pair of adjacent vortices downstream of the downstream edge of the member. The vortices energize the boundary layer adjacent the diffuser section wall and delay or eliminate its separation therefrom. Thus, a diffuser can accomplish the same amount of diffusion in a shorter length (i.e., can operate effectively with greater diffusion angles) or can achieve a greater amount of diffusion for a given length than was possible with prior art diffusers. The proper orientation of the member and its troughs and lobes can also result in the fluid leaving the troughs with a direction of momentum that carries it toward the diffuser wall surface.

It is believed that the vortices generated from each side wall surface at the trough outlet are large-scale vortices. (By "large-scale" it is meant the vortices have a diameter about the size of the overall trough depth.) These two vortices (one from each sidewall) rotate in opposite directions and create a flow field which tends to cause fluid from the trough and also from the nearby bulk fluid to mix with the fluid near the diffuser wall surface immediately downstream of the member. The net affect of these phenomenon is to direct bulk fluid outwardly toward the diffuser wall surfaces and also to create bulk fluid mixing within the diffuser section, all of which energize the boundary layer along the diffuser wall thereby improving diffuser performance. Even if the convoluted member is not close enough to the diffuser wall to energize the boundary layer and delay separation, or if the diffuser wall is much too steep to avoid separation, the mixing of bulk fluid within the diffuser caused by the large-scale vortices may still improve overall diffuser performance.

The troughs and lobes of the present invention are preferably contoured such that they flow full (i.e., no streamwise, two-dimensional boundary layer separation occurs within the troughs). Thus, it is important there is no streamwise, two-dimensional boundary layer separation of the flow over the member immediately upstream of the troughs thereof as this would result in separated flow entering the troughs, which would inhibit the formation of strong vortices. The prevention of streamwise, two-dimensional boundary layer separation within the troughs is an important consideration in their design. For example, two-dimensional boundary layer separation may occur if the slope of the bottom of a trough is too steep relative to the nearby bulk fluid flow direction.

Preferably the troughs and lobes are U-shaped in cross section taken perpendicular to the downstream direction and are preferably smoothly curved (e.g., no sharp angles where trough sidewall surfaces meet the trough floor) to minimize losses. Most preferably the troughs and lobes form a smoothly undulating surface which is wave-shaped in cross section perpendicular to the downstream direction.

According to another aspect of the present invention, it is preferred that the fluid exiting from each trough have a lateral component of velocity as small as possible to minimize secondary flow losses. For this reason the trough sidewalls, for a significant distance upstream of the trough outlet, are preferably parallel to the direction of bulk fluid flow entering the trough.

One important advantage of the present invention is its ability to improve diffuser performance without introducing substantial flow losses as a result of its own presence in the flow field.

In accordance with another aspect of the present invention, it is preferred that the trough sidewalls at the outlet be steep. This is believed to increase the intensity of the vortex generated by the sidewall. The word "steep" as used herein and in the claims means that, in cross section perpendicular to the direction of trough length, lines tangent to the steepest point on each sidewall intersect to form an included angle of no more than about 120°. Most preferably the walls are parallel to each other. For purposes of this application, when the walls are parallel the included angle shall be considered to be 0°.

Commonly owned U.S. Pat. application Ser. No. 857,907 filed on Apr. 30, 1986 titled, Airfoil Shaped Body, by Walter M. Presz, Jr. et al. describes an airfoil trailing edge region with streamwise troughs and ridges (convolutions) formed therein defining a wave-like, thin trailing edge. The troughs in one surface define the ridges in the opposing surface. The troughs and ridges help delay or prevent the catastrophic effects of two-dimensional boundary layer separation on the airfoil suction surface, by providing three-dimensional relief for the low momentum boundary layer flow. The present invention, however, is directed to improving the performance of a diffuser located just downstream of a convoluted member.

The foregoing and other objects, features and advantages of the present invention will be come more apparent in the light of the following detailed description of preferred embodiments thereof as shown in the accompanying drawings.

BEST MODE FOR CARRYING OUT THE INVENTION

Figure 14:
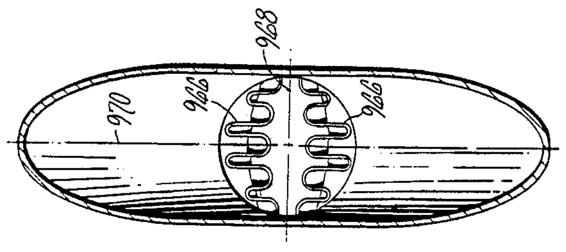
FIG. 14 is a view taken generally along the line 14—14 in FIG. 13.

As will be more fully described hereinafter, the convoluted wall member of the present invention is used immediately upstream of or at a diffuser inlet to create fluid flow downstream of the member which help diffuse the fluid and also energize the boundary layer along the diffuser wall, whereby the diffuser performance is improved. The fluid dynamics is similar to the fluid dynamics involved in commonly owned U.S. Pat. application Ser. No. 117,770 entitled Convoluted Plate to Reduce Base Drag, by Robert W. Paterson et al filed on Nov. 5, 1987 and of which this application is a continuation-in-part. FIGS. 14 and 14A of U.S.S.N. 117,770 are reproduced in this application as FIGS. 1 and 1A. In that application a convoluted plate was disposed upstream of a blunt end surface of a moving body to reduce base drag by generating certain fluid dynamic flow patterns downstream of the plate. As described therein, and with reference to FIGS. 1 and 1A, a blunt based article is generally represented by the reference numeral 200. The article 200 has a smooth, relatively flat upper surface 202 over which fluid flows in the generally downstream direction represented by the arrows 204. The article 200 has a blunt base or end surface 206. Without the convoluted plate the flow along the surface 202 is assumed to separate from the article along the line 208. For purposes of the present discussion the separation line 208 shall be considered the beginning or upstream edge of the blunt end surface 206.

A convoluted wall member or plate 210 is mounted on and spaced from the surface 202 by mean of support members or standoffs 212, only one of which is shown in the drawing. The plate 210 has an upstream or leading edge 214 and a downstream or trailing edge 216. While the plate may be fairly thin, the leading edge 214 should be rounded, like the leading edge of an airfoil, to assure that attached uniform flow is initiated on both the upper surface 218 and lower surface 220 of the plate. The plate may then taper to a smaller thickness, if desired, toward the trailing edge 216, such as to save weight or to minimize base drag of the plate itself.

A plurality of U-shaped troughs 222 and lobes 224 are formed in the plate. Adjacent troughs and lobes blend smoothly into each other forming an undulating or convoluted downstream portion of the plate which terminates as a wave-shape at its trailing edge 216 For vortices to be generated trough depth must increase in the downstream direction, although trough depth could reach its maximum upstream of the trough outlet and thereafter remain constant to the outlet. In FIG. 1, the plate leading edge 214 is straight and the plate is initially flat for a short distance The troughs and lobes blend smoothly into the flat portion. Preferably, and as shown, trough depth (and lobe height) are zero at their upstream ends and are maximum at the downstream edge 216; however, the plate leading edge 214 could have a low amplitude wave shape, and the trough depth would increase from that initial amplitude. The contour and shape of the troughs and lobes is selected such that the troughs flow full throughout their length.

Since the plate 210 is attached to the article 200, the plate itself creates losses (i.e. drag) which should be minimized. If one initially considers an imaginary, smooth plate without convolutions and which is generally parallel, locally, to the surface above which it is disposed, the peaks and valleys of the troughs and lobes preferably extend an equal distance above and below such "imaginary" plate.

The vortices generated by the troughs and lobes on each side of the plate are shown schematically in the drawing A vortex, having its axis in the bulk fluid flow direction, is generated off of each sidewall of each trough. Thus, the trough 226 generates a clockwise rotating vortex 228 from its right sidewall (as viewed in FIG. 1) and a counter clockwise rotating vortex 230 from its left sidewall. An adjacent trough 232 on the opposite side of the plate to the left of the trough 226 also generates a counter clockwise rotating vortex 234 from its right wall which combines with and reinforces the counter clockwise rotating vortex 230 to form what is effectively a single, stronger vortex. Similarly, the left sidewall of the trough 236 generates a clockwise rotating vortex 238 which combines with the clockwise rotating vortex 228 from the trough 226.

If the plate 210 is properly spaced and oriented relative to both the surface 202 and the blunt end surface 206, then the vortices generated therefrom will energize the boundary layer flow on the surface 202 downstream of the plate thereby resulting in the flow remaining attached to the article surface beyond the imaginary separation line 208. Furthermore, it is believed the bulk fluid flowing from the troughs and over the surface 202 is directed downwardly (in FIG. 1) into the space behind the blunt end surface 206 to further reduce the separation bubble which would otherwise be formed and thereby further reduce base drag.

For purposes of the following discussion, and still referring to FIG. 1, P is the wave length at the plate trailing edge 216; A is the wave height or amplitude (and may also be referred to as the trough depth) or lobe height which is measured from a lobe peak to the bottom of an adjacent trough; H is the distance between the surface 202 and the closest wave peaks of the trailing edge 216; and D is the distance between the trailing edge 216 and the upstream edge of the blunt end surface which is the separation line 208 as discussed above. Preferably the wave length P is constant over the full length of the troughs.

Since the vortices do not become fully developed for a distance downstream of the plate edge 216, and because it is desired to have the vortices energize the boundary layer upstream of the line 208, it is preferred that the trailing edge 216 be located a distance D equal to one to two wave amplitudes A upstream of the blunt end surface 206. This does not mean that no benefit would be achieved if D were less than A or even zero; however, it is believed the advantages would be lessened Similarly, if the plate is situated too far upstream from the end surface 206 the vortices might significantly or completely dampen out before reaching the end surface 206 and thereby provide little or no benefit.

The distance H should be sufficiently great to avoid creating secondary flow fields or blockage adjacent the surface 202 which might disrupt and cause separation of the boundary layer on the surface 202 before it reaches the line 208. It is believed that H should be at least about the thickness of the boundary layer. Concurrently, the distance H should be small to keep the vortices as close to the surface 202 as possible. The slope $\theta$ of the trough bottom relative to the bulk fluid flow direction adjacent the plate cannot be too shallow or too steep. If the slope is too shallow, the strength of the vortices generated will be too weak or they may not be generated at all as a result of losses from surface friction. It is believed that $\theta$ should be at least about 5°. On the other hand, if the slope is too steep the troughs will not flow full (i.e., there will be two-dimensional streamwise boundary layer separation within the troughs). This will hinder the formation of the vortices. It is likely that the greater the slope, the greater the intensity of the vortices, as long as the troughs flow full. It is believed that slopes greater than about 30° will not flow full. The optimum angle for any particular application will need to be determined by experimentation.

As far as the steepness of the sidewalls of each trough is concerned, substantially parallel sidewalls at the trailing edge 216 and for a distance upstream thereof are preferred. The steepness of the sidewalls may be represented by the included angle C (depicted in FIG. 1), which is the angle between lines tangent to the steepest points along the opposed sidewalls of a trough. As stated above, the closer the angle C is to 0°, the better; however, the angle C should be no greater than about 120° at the trough outlet.

Preferably the overall length of the plate from its leading edge 214 to its trailing edge 216 is equal to or slightly greater than the length L of the troughs and ridges. Excessive length, while not devastating, will also not provide any advantage and will simply add unnecessary surface drag, cost and weight. As mentioned above, the leading edge 214 should be rounded and the troughs and lobes should be shaped and sized along their entire length to assure that the troughs flow full throughout their length and generate vortices which are sufficiently strong to provide a benefit (i.e., drag reduction) deemed to be worthwhile considering the needs of the particular application.

In general, it is believed that the wave length P should be no less than about half and no more than about four times the wave amplitude A in order to assure the formation of strong vortices without inducing excessive pressure losses. The sum of the downstream projected cross-sectional flow areas of the trough outlets should be large enough, relative to the total downstream projected area of the blunt end surface to have a worthwhile impact on base drag. Practical considerations such as physical constraints, cost and weight, and even aesthetics will also have various degrees of impact upon the final configuration selected.

Figure 1A:
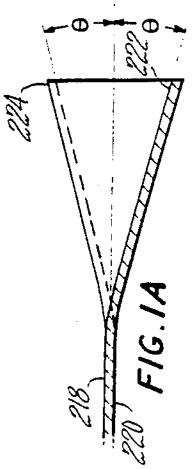
FIG. 1A is a view taken generally in the direction 1A—1A of FIG. 1.
Figure 1:
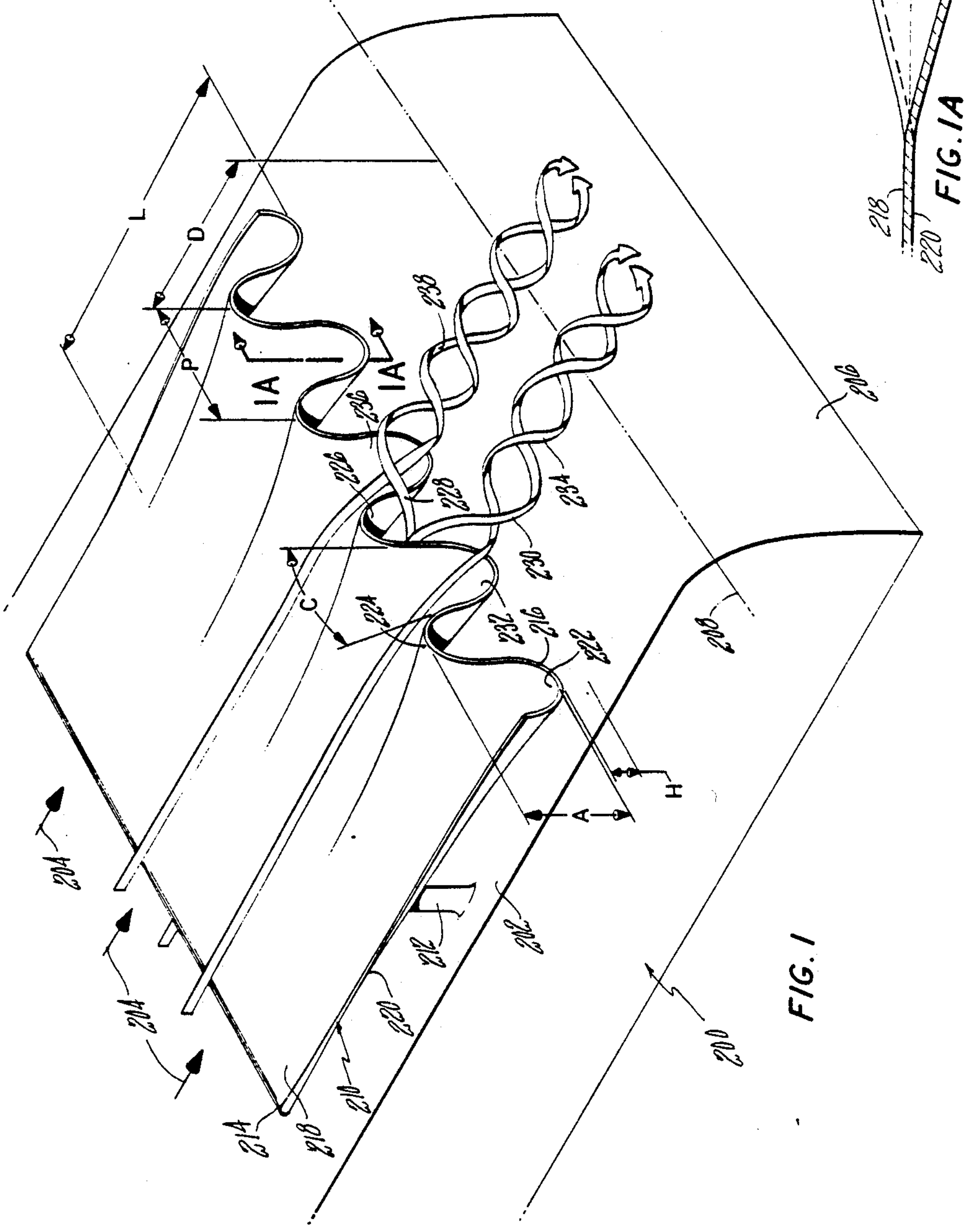
FIG. 1 is a perspective view which illustrates the use of a convoluted plate to reduce base drag in accordance with the teachings of related, commonly owned U.S. Pat. application Ser. No. 117,770.
Figure 2:
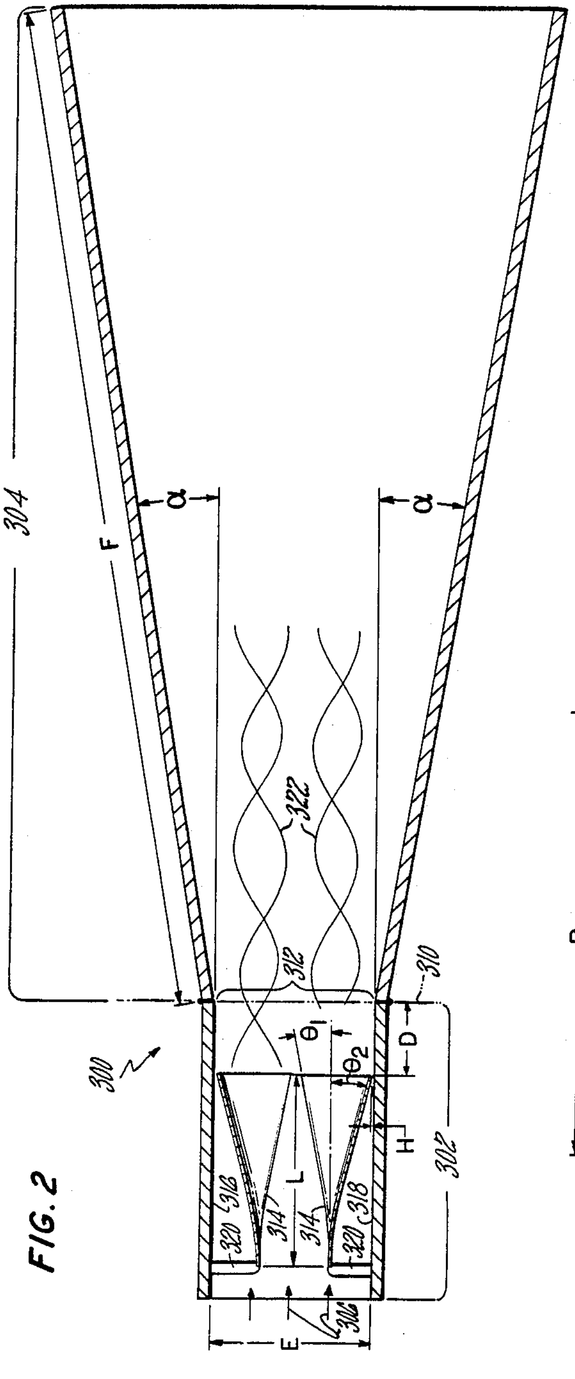
FIG. 2 is a cross sectional view of a two dimensional diffuser incorporating the features of the present invention.
Figure 3:
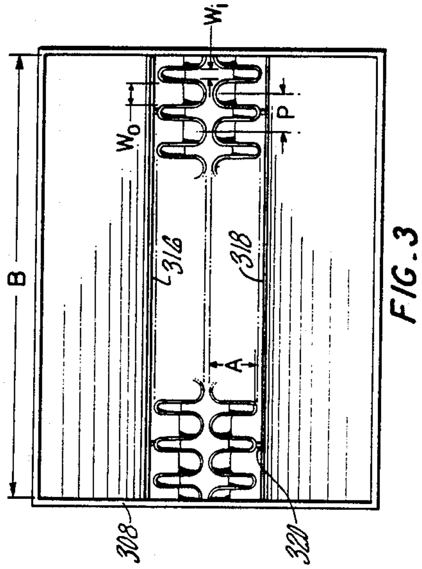
FIG. 3 is a view taken generally in the direction 3—3 of FIG. 2.

FIGS. 2–3 show another application for the convoluted wall member or plate described in FIGS. 1 and 1A; and that application is the subject of the present invention. With reference to FIGS. 2–3, a conduit is generally represented by the reference numeral 300. The conduit 300 includes a fluid delivery section 302 and a diffuser section 304. Both are rectangular in cross section taken perpendicular to the flow direction, which is in the direction of the arrows 306. The delivery section 302 and the diffuser section 304 both include flat, parallel sidewalls 308. Thus, the diffuser section 304 provides only two-dimensional diffusion. The plane 310 is at the interface between the delivery section 302 and the diffuser section 304 and is coextensive with the diffusion section inlet 312.

Disposed within the conduit delivery section 302 are convoluted plates 3!4. One is attached to the upper wall 316 and the other to the lower wall 318 of the delivery section by means of legs 320. The large-scale vortices generated by the plates are illustrated by the spirals 322 and have axes generally parallel to the downstream direction 306.

The preceding description of FIGS. 1 and 1A with respect to size, shape, contour and location of the convoluted plate 210 applies equally as well to the convoluted plate 314, with the plane 310 in FIG. 2 corresponding to the line 208 of FIG. 1 in diffusers which would separate at the inlet without the presence of the convoluted plates. Thus, all of the dimensions L, D, H, A and P, as well as the angle $\theta$ should be selected in the same manner as described with respect to FIGS. 1 and 1A. While in the application of FIGS. 1 and 1A the convoluted plate reduces base drag on a moving body, the present invention improves the performance of a diffuser by energizing the boundary layer along the diffuser walls and by causing general mixing and diffusion of the bulk fluid flow within the diffusing section 304.

A two-dimensional diffuser like that of FIGS. 2 and 3 was tested both with and without convoluted plates. With reference to FIGS. 2 and 3, the diffuser had the following dimensions: B =21.1 inch; F=32.7 inch; and E=5.4 inch. With respect to the convoluted plates, D=2.3 inch; L=6.3 inch; H=0.25 inch; A=2.3 inch; P=1.7 inch; $W_i$=0.5 inch; $W_o$=1.2 inch; $\theta_1$=11°; and $\theta_2$=15°. The sidewalls of each trough were parallel to each other, as shown in FIG. 3. While FIGS. 2 and 3 depict the test apparatus with the dimensions hereinabove set forth such dimensions and the relative values of such dimensions to each other are not intended to limit the invention. For example, the troughs on both sides of each plate may be identical (i.e., $W_i=W_o$ and $a_1=a_2$). Optimum configurations for a particular application may only be obtained by experimentation using the guidelines set forth herein.

Figure 4:
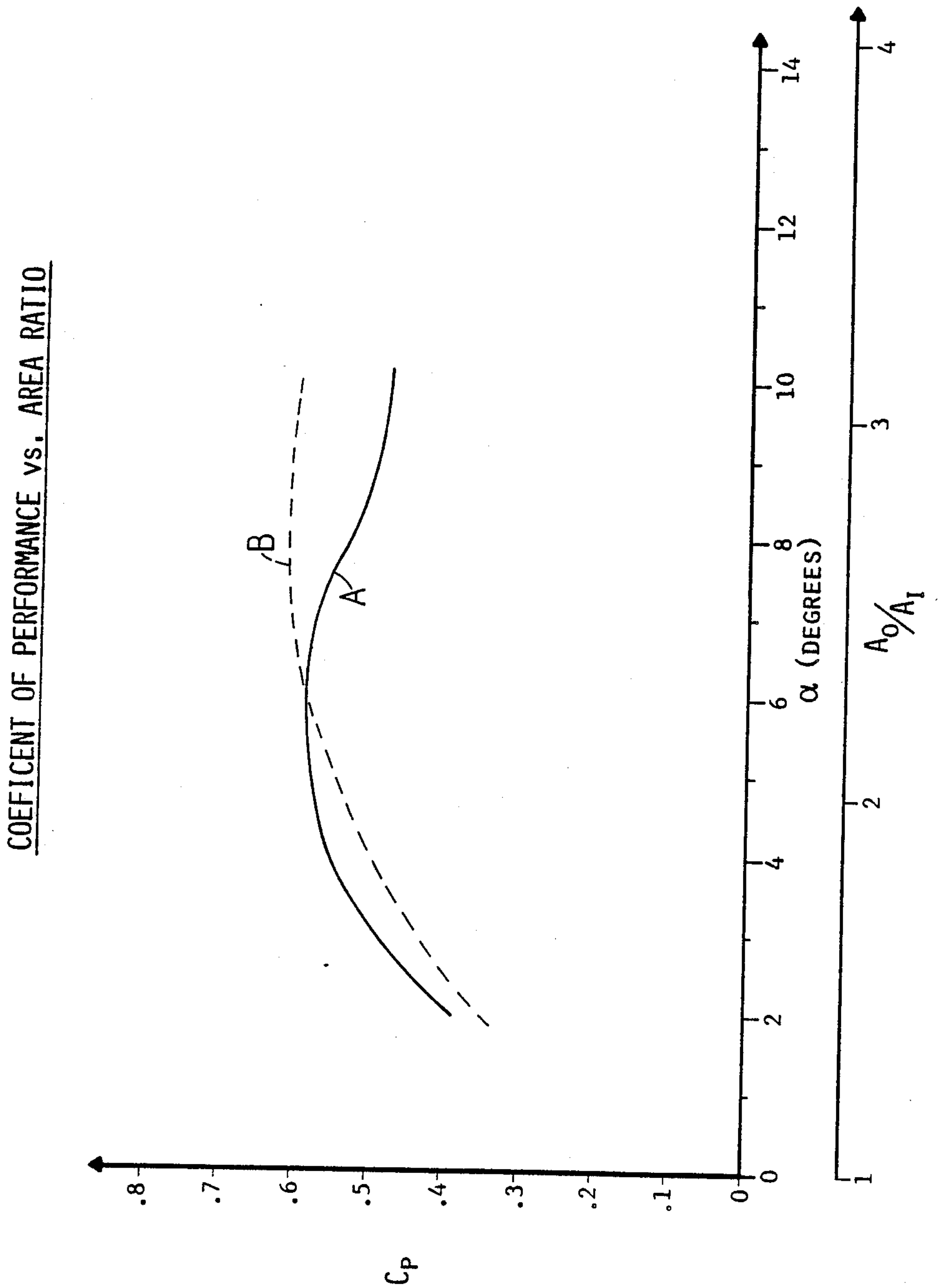
FIG. 4 is a graph displaying the results of tests for the embodiment of the present invention shown in FIGS. 2 and 3, as well as the prior art.

In both series of tests (i.e., with and without the convoluted plates) the coefficient of performance of the diffuser was measured for diffuser half-angles $\alpha$ ranging from about 2° to 10°, which is equivalent to an outlet to inlet area ratio range of from about 1.4 to 3.1. The results of the tests are displayed in the graph of FIG. 4 wherein the curve A represents no convoluted plates and B represents the use of convoluted plates. For diffuser half-angles greater than about 6° (up to at least the maximum angle tested) the present invention outperformed (in terms of the coefficient of performance) the same diffuser without the convoluted plates. At a 10° half-angle the present invention had a coefficient of performance higher than the maximum coefficient of performance (i.e., at a 6° half-angle) of the diffuser without the convoluted plates and about 25 percent greater than that of the same diffuser with a 10° half-angle and no convoluted plates. The present invention also delayed the onset of boundary layer separation to higher half-angles.

Figure 6:
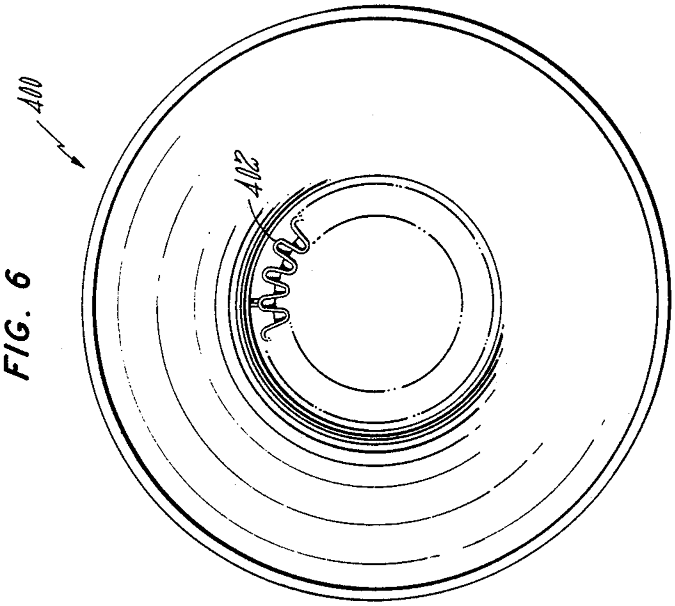
FIG. 6 is a view taken generally in the direction 6—6 of FIG. 5.
Figure 5:
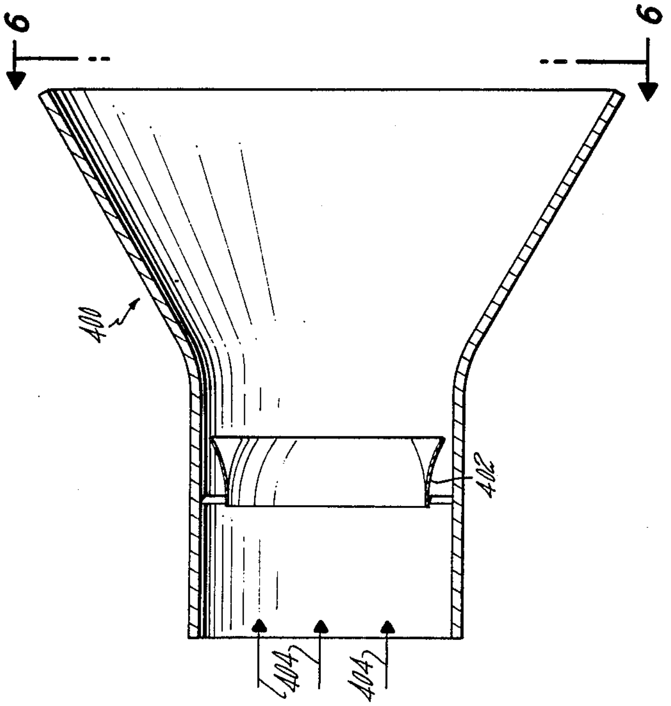
FIG. 5 is sectional view of an axisymmetric diffuser incorporating the features of the present invention.

FIGS. 5 and 6 illustrate the use of the present invention in conjunction with an axisymmetric three-dimensional diffuser 400. In that case a convoluted thin wall member 402 is axisymmetric, with the lobes and troughs extending axially in the downstream direction 404 and radially (in height and depth).

Figure 7:
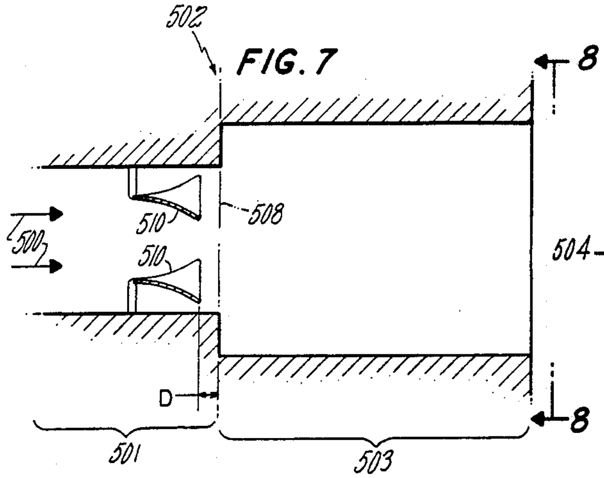
FIG. 7 is a sectional view of a two-dimensional "stepped" diffuser incorporating the features of the present invention.
Figure 8:
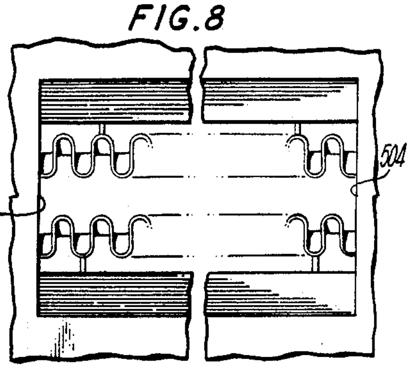
FIG. 8 is a view taken generally in the direction 8—8 of FIG. 7.

The invention can also be used in conjunction with a "stepped" diffuser, as shown in FIG. 7 and 8. A stepped diffuser may be considered one in which the diffuser half-angle is extremely steep, such as 90°. This type of diffuser is typically a conduit which includes a step change (i.e., sudden increase) in passage cross sectional flow area. In FIGS. 7 and 8, fluid flowing a conduit 502 in the downstream direction is represented by the arrows 500. The conduit has an inlet section 501 of rectangular cross sectional area and an outlet section 503, also of rectangular cross sectional area. The inlet section has sidewalls 504 parallel to each other and the downstream direction, and upper and lower walls 507 also parallel to the downstream direction and to each other. A step change in the passage cross sectional area occurs at the plane 508. The discontinuity is only in the upper and lower walls 507. The sidewalls 504 remain parallel past the discontinuity for the entire length of the outlet section 503.

Disposed adjacent and supported from each of the upper and lower sidewalls 507 is convoluted plate 510 similar to that shown in FIGS. 2 and 3. The distance D of the plate upstream of the plane 508 should be anywhere from about zero to twice the trough depth and most preferably one to two times the trough depth.

Although with a stepped diffuser such as shown in FIG. 7 the convoluted plates cannot keep the flow attached to the walls, they can reduce the distance downstream of the plane 508 where reattachment of the flow to the upper and lower walls occurs. The bottom line is that the stepped diffuser will have lower losses than would occur without the use of the convoluted plates. Also, although in this embodiment a convoluted plate is disposed adjacent each of the upper and lower walls, a single, perhaps larger (in terms of wave amplitude) plate disposed in the center of the conduit would also provide benefits.

Figure 9:
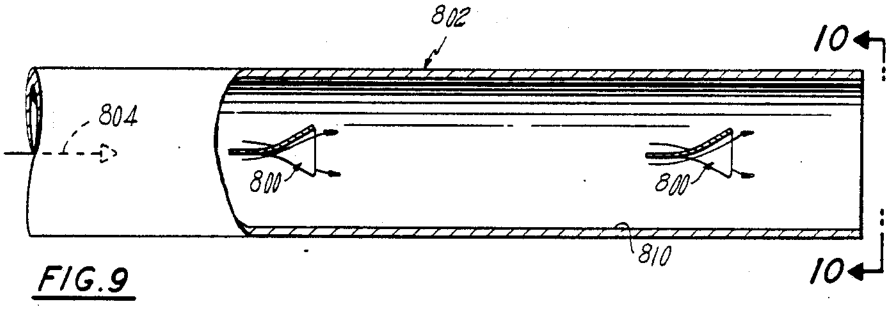
FIG. 9 is a sectional view illustrating the use of convoluted plates in a heat exchanger application in accordance with the teachings of related, commonly owned U.S. Pat. application Ser. No. 947,349.
Figure 10:
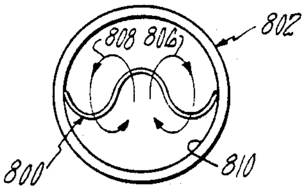
FIG. 10 is a sectional view taken generally along the line 10—10 of FIG. 9.

Commonly owned U.S. Pat. application Ser. No. 947,349, entitled Heat Transfer Enhancing Device by Walter M. Presz, Jr. et al., filed on Dec. 29, 1986 describes a convoluted plate similar to that described herein but used in heat transfer apparatus to improve heat transfer across a wall having fluids flowing on both sides thereof. FIGS. 9 and 10 of this application correspond to FIGS. 8 and 9, respectively, of that commonly owned application and show a convoluted wall or plate 800 disposed within a tube or conduit 802 which carries fluid flowing in the direction of the arrow 804. As best shown in FIG. 10, the plate 800 extends substantially across the tube along a diameter. The lobes and troughs in the downstream portion of the plate 800 generate adjacent counterrotating vortices 806, 808 downstream thereof which scrub the thermal boundary layer from the internal wall surface 810 of the tube and mix the core flow with the fluid flowing adjacent the wall. The net effect is to increase the coefficient of heat transfer between the fluid and the wall of the conduit 802 for the purpose of ultimately exchanging heat energy between the fluid within the conduit and fluid surrounding the conduit. As shown in FIG. 9, it is contemplated to dispose a plurality of convoluted plates 800 within the conduit, spaced apart along the axis of the conduit at distances which will ensure improvement in the heat transfer rate along the entire length of the conduit. This is, of course, required since the vortices generated by each plate 800 eventually die out due to wall friction and viscous effects.

While the present invention is not a heat transfer device, it does utilize the same convoluted plates disposed in a conduit for the purpose of influencing the fluid flow dynamics in a diffusion section of the conduit downstream of the plate. We have discovered that such plates generate large-scale vortices to (1) energize the boundary layer to improve diffuser performance, and (2) increase mixing of the bulk fluid across the duct in directions perpendicular to the bulk fluid flow, which also improves diffuser performance.

A specific application for the wall members of the present invention is in a catalytic converter system, such as for an automobile. Such a converter system is generally represented by the reference numeral 900 in FIGS. 11 and 12 The converter system 900 comprises a cylindrical gas delivery conduit 902, an elliptical gas receiving conduit 904, and a diffuser 906 which is a transition duct or conduit between them. The bulk fluid flow direction is represented by the arrows 905 and is parallel to the axis 907 of the delivery conduit 902. The diffuser 906 extends from the circular outlet 908 of the delivery conduit to the essentially elliptical inlet 910 of the receiving conduit 904. The receiving conduit holds the catalyst b ®d (not shown). The catalyst bed is preferably a honeycomb monolith with the honeycomb cells parallel to the downstream direction. The inlet face of the monolith is at the inlet 910; however, it could be moved further downstream to allow additional diffusion distance between the delivery conduit outlet 908 and the catalyst. Catalysts for catalytic converters and catalyst bed configurations are well known in the art.

Figure 12:
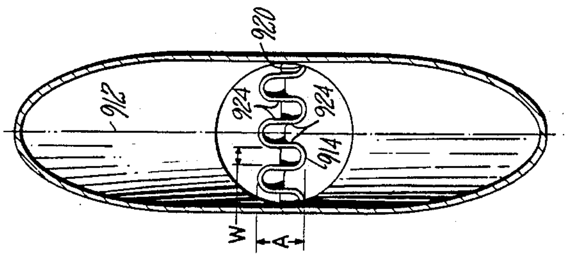
FIG. 12 is a view taken generally in the direction 12—12 of FIG. 11.

As best seen in FIG. 12, diffusion occurs only in the direction of the major axis 912 of the ellipse. The minor axis of the ellipse remains a constant length equivalent to the diameter of the delivery conduit outlet 908. Thus, the diffuser 906 of this embodiment is effectively a two-dimensional diffuser. Disposed within the delivery conduit 902 is a convoluted plate 914 having a plurality of parallel troughs therein. The plate 914 extends across the conduit 902 along approximately a diametral plane which is perpendicular to the major axis 912 of the elliptical gas receiving conduit 804. The plate 914 is attached at its side edges 920 to the conduit 902. The trough sidewalls 924 are preferably parallel to each other at the downstream wave-shaped edge 922 of the plate and are also preferably parallel to the ellipse major axis 912. Although optimum plate size and configuration will need to be determined by experimentation, using the teachings of the present invention as a guide, it is believed there should be at least two complete troughs on one side of the plate (there are three in the embodiment of FIG. 12) and the troughs should have a depth at their downstream edge which is a large percentage of the available space within the conduit. Although it is believed that the best results will be obtained when the trough depth direction is parallel to the major direction of diffusion, it is also believed that improved diffusion may be obtained with the plate 914 oriented in virtually any direction, such as perpendicular to the direction shown in FIG. 12.

Figure 11:
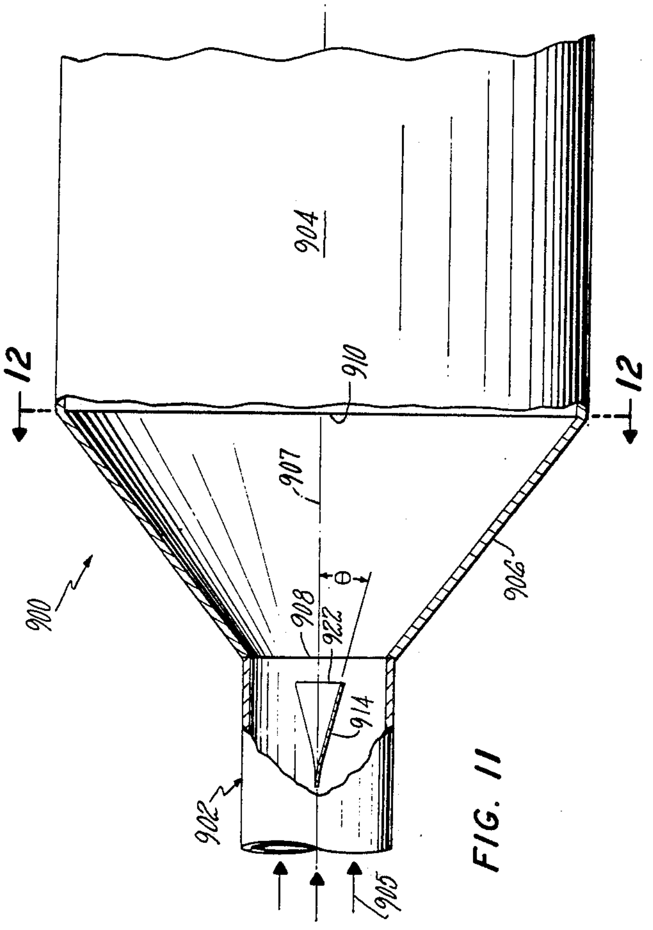
FIG. 11 is a sectional view of a catalytic converter system incorporating the features of the present invention.

If the conduit 902 of FIGS. 11 and 12 has a diameter of 2.0 inches, one possible set of dimensions for the plate 914 is a trough slope $\theta$ of 15°; a wave amplitude A of 1.0 inch; a trough width W of about 0.30; and a plate thickness of about 30 mils.

Figure 13:
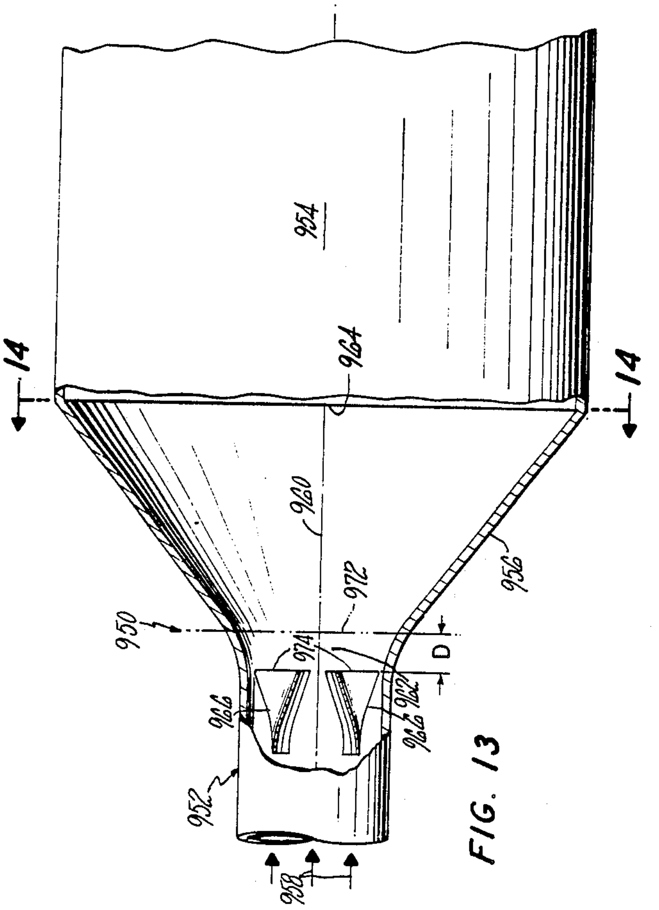
FIG. 13 is a sectional view showing another embodiment of a catalytic converter system incorporating the features of the present invention.

FIGS. 13 and 14 show another embodiment of a catalytic converter system. This system is generally represented by the reference numeral 950 and comprises a cylindrical gas delivery conduit 952, an elliptical gas receiving conduit 954, and a diffuser 956 which is a transition duct or conduit between them. The bulk fluid flow direction is represented by the arrows 958 and is parallel to the axis 960 of the delivery conduit. The diffuser 956 extends from the circular outlet 962 of the delivery conduit and smoothly transitions to the elliptical inlet 964 of the receiving conduit, which holds the catalyst bed (not shown) whose inlet face corresponds with the plane of the inlet 964.

In this embodiment the converter system is considered to be analogous to the two-dimensional diffuser described in FIGS. 2 and 3. Thus, a pair of slightly curved convoluted plates 966 are disposed within the delivery conduit 952, both extending across the duct in a direction substantially parallel to a diametral line which is parallel to the minor axis 968 of the elliptical receiving conduit and perpendicular to the major axis 970. The plates 966 are positioned close to, but are spaced from, the surfaces of the delivery conduit which are disposed above and below the diametral line or axis 968.

The plane 972 represents the axial location along the diffuser 956 where two-dimensional streamwise boundary layer separation would normally occur without the use of the convoluted plates 966. The downstream wave-shaped edges 974 must be spaced upstream of the plane 972 in order to delay separation of the flow beyond the plane 972. It is believed that best results will be obtained if the distance D is about one to two times the maximum wave amplitude of the plates 966. This allows some downstream distance for the large-scale vortices generated by the convoluted plates to become more fully developed before reaching the location of the plane 972.

In this embodiment the wave forms of the upper and lower plates 966 are out of phase. The wave forms could also be in phase as shown in the embodiment of FIGS. 7 and 8, which may produce coupling of the generated vortices, and thereby further improve mixing. Assuming a two-inch diameter for the delivery conduit 952, it is recommended that the maximum wave amplitude for each plate 966 be between about 0.5 and 0.75 inch.

Although this invention has been shown and described with respect to preferred embodiments thereof, it will be understood by those skilled in the art that various changes in the form and detail thereof may be made without departing from the spirit and scope of the claimed invention.

We claim:

1. A diffusing device including a conduit for carrying a fluid in a downstream direction, said conduit having wall means, said wall means having an internal flow path defining surface, said conduit including an upstream fluid delivery portion having an outlet end with a first cross-sectional flow area, a downstream fluid receiving portion having an inlet end of second cross-sectional flow area larger than said first cross-sectional flow area, said wall means interconnecting said outlet end and said inlet end whereby fluid diffuses while traveling downstream from said outlet end into said fluid receiving portion, a thin, vortex generating wall member disposed within said fluid delivery portion upstream of said outlet end and having oppositely facing downstream extending flow surfaces, an upstream edge and a downstream edge, said member having a convoluted portion comprising a plurality of adjoining, alternating, U-shaped lobes and troughs extending in the direction of bulk fluid flow adjacent thereto and spaced from said internal flow path defining surface and terminating at said downstream edge, the tough depth and lobe height increasing in the bulk fluid flow direction, the shape and dimensions of said troughs and lobes being selected to insure that each trough generates a pair of adjacent large-scale vortices downstream of said outlet end, the pair of adjacent vortices generated by each trough rotating in opposite directions about respective axes extending in the downstream direction.

2. The diffusing device according to claim 1 wherein said troughs and lobes initiate downstream of said upstream edge with substantially zero depth and height respectively.

3. The device according to claim 1 wherein each of said troughs is smoothly U-shaped along the trough length in cross section perpendicular to the downstream direction and blends smoothly with the lobes adjacent thereto to define a smoothly undulating surface which is wave-shaped in cross-section perpendicular to the downstream direction.

4. The device according to claim 3 wherein the trough depth at said downstream edge is A, and said downstream edge is located between about 1A and 2A upstream of said delivery portion outlet end.

5. The device according to claim 3 wherein said outlet end of said delivery portion and said inlet end of said receiving portion are located in substantially the same plane whereby there is a step-wise increase in cross-sectional flow area substantially in said plane.

6. The device according to claim 3 wherein said receiving portion inlet end is spaced downstream from said delivery portion outlet end, said device including a diffuser section joining said outlet end to said inlet end, said diffuser section including a diffuser which gradually increases in cross-sectional area from said outlet end to said inlet end.

7. The device according to claim 6 wherein said downstream edge of said wall member is positioned such that the large-scale vortices generated from said troughs create mixing of the bulk fluid within said diffuser section and increases the coefficient of performance of said diffuser.

8. The device according to claim 6 wherein said wall member is disposed sufficiently close to said internal flow path defining surface of said fluid delivery portion that the large-scale vortices generated by said member energize the boundary layer within said diffuser and increase the coefficient of performance of said diffuser.

9. The device according to claim 6 wherein said wall member is located and oriented within said delivery portion such that flow separation from the wall of the diffuser initiates at diffuser half-angles greater than it would otherwise initiate at without the presence of said convoluted member.

10. The device according to claim 6, wherein said delivery portion of said conduit is symmetrical about a downstream extending axis.

11. The device according to claim 10, wherein said diffuser is a three dimensional diffuser and said wall member is symmetrical about said axis.

12. The device according to claim 10, wherein said delivery portion is cylindrical, and said wall member extends across a diametral plane.

13. The device according to claim 6, wherein said wall member extends across a substantial portion of the width of said delivery portion of said conduit.

14. The device according to claim 6, wherein said device is a catalytic converter for delivering exhaust gases from said delivery portion into and through said receiving portion, and wherein said receiving portion has a catalyst bed disposed therein.

15. The device according to claim 14, wherein said delivery portion is cylindrical and said diffuser and receiving conduit portion are substantially elliptical in cross-section perpendicular to the downstream flow direction.

16. The device according to claim 15, wherein said diffuser is substantially a two-dimensional diffuser with diffusion parallel to the major axis of the elliptical cross-section.

17. The device according to claim 15, wherein the direction of trough depth is substantially parallel to the major axis of the elliptical cross-section.

18. The device according to claim 17, wherein said wall member is disposed substantially along a diametral plane including the minor axis of said elliptical cross-section, and said troughs are alternately above and below said plane.

19. The device according to claim 3, wherein each trough has a bottom and the slope of the bottoms of said troughs relative to the bulk fluid flow direction is between 5° and 30°, each of said troughs including a pair of facing sidewalls, wherein lines tangent to each of said pair of sidewalls at their steepest points at said member downstream edge form an included angle of between 0° and 120°.

20. The device according to claim 3, wherein each trough has a bottom and the slope of the bottoms of said troughs relative to the bulk fluid flow direction is between 5° and 30°; and each trough includes a pair of facing sidewalls which are substantially parallel to each other.

21. A catalytic conversion system including a gas delivery conduit having an internal flow path defining surface and an outlet of first cross-sectional flow area, a receiving conduit having an inlet of second cross-sectional flow area larger than said first cross-sectional flow area and spaced downstream of said delivery conduit outlet and including a catalyst bed disposed therein, and an intermediate conduit defining a diffuser having a flow surface connecting said outlet to said inlet, the improvement comprising:

a thin vortex generating wall member disposed within said delivery conduit upstream of said outlet and having oppositely facing downstream extending flow surfaces, an upstream edge and a downstream edge, said member having a convoluted portion comprising a plurality of adjoining, alternating, U-shaped lobes and troughs extending in the direction of bulk fluid flow adjacent thereto and spaced from said internal flow path defining surface and terminating at said downstream edge, said trough depth and lobe height increasing in the bulk fluid flow direction, the shape and dimension of said troughs and lobes being selected to insure that each trough generates a pair of adjacent large-scale vortices downstream of said outlet and within said intermediate conduit, the pair of adjacent vortices generated by each trough rotating in opposite directions about respective axes extending in the downstream direction.

22. The catalytic conversion system according to claim 21, wherein each of said troughs has a downstream extending floor which has a slope of no less than about 5° and no more than about 30° relative to the downstream direction.

23. The catalytic conversion system according to claim 22, wherein said downstream edge of said wall member is positioned such that said large-scale vortices generated from said troughs create mixing of the bulk fluid within said intermediate conduit and increases the coefficient of performance of said diffuser.

24. The catalytic conversion system according to claim 22, wherein each of said troughs is smoothly U-shaped along the trough length in cross section perpendicular to the downstream direction and blends smoothly with the lobes adjacent thereto to define a smoothly undulating surface which is wave-shaped in cross-section perpendicular to the downstream direction.

25. The catalytic conversion system according to claim 23 wherein said delivery conduit has opposed internal surfaces, said system including a pair of said convoluted wall members, one of said pair being disposed adjacent but spaced from one of said opposed internal surfaces and the other of said pair being disposed adjacent but spaced from said other one of said opposed internal surfaces and from said other wall member.

26. The catalytic conversion system according to claim 24, wherein said delivery conduit outlet is circular and said receiving conduit inlet is elliptical, and wherein the direction of the depth dimension of said troughs is substantially parallel to the major axis of said elliptical inlet.

27. The catalytic conversion system according to claim 24, wherein each of said troughs includes a pair of parallel, facing sidewalls.

28. The catalytic conversion system according to claim 27, wherein said diffuser is substantially a two-dimensional diffuser having a direction of diffusion substantially parallel to said trough sidewalls.

29. The catalytic conversion system according to claim 24, wherein said troughs and ridges are sized, contoured and arranged to flow full over their length whereby two-dimensional boundary layer separation on the surface of said troughs and lobes does not occur during normal operation.

30. The catalytic conversion system according to claim 24, wherein the trough depth at said downstream edge is A, and said downstream edge is located between about 1A and 2A upstream of said delivery conduit outlet.

* * * * *

UNITED STATES PATENT AND TRADEMARK OFFICE
CERTIFICATE OF CORRECTION

PATENT NO. : 4,971,768

DATED : November 20, 1990

INVENTOR(S) : Robert H. Ealba et al.

It is certified that error appears in the above-identified patent and that said Letters Patent is hereby corrected as shown below:

In the claims, claim 1, col. 12, line 30, "tough" should read --trough--

Claim 25, col. 14, line 44, "23" should read --24--.

Signed and Sealed this

Twelfth Day of May, 1992

*Attest:*

DOUGLAS B. COMER

*Attesting Officer*

*Acting Commissioner of Patents and Trademarks*